(12) United States Patent
Yang et al.

(10) Patent No.: US 12,512,020 B2
(45) Date of Patent: Dec. 30, 2025

(54) DISPLAY MODULE, MANUFACTURING METHOD THEREOF, AND DISPLAY DEVICE

(71) Applicant: Wuhan China Star Optoelectronics Semiconductor Display Technology Co., Ltd., Hubei (CN)

(72) Inventors: Jun Yang, Hubei (CN); Kuihua You, Hubei (CN); Chihshun Tang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 1239 days.

(21) Appl. No.: 17/312,415

(22) PCT Filed: Apr. 26, 2021

(86) PCT No.: PCT/CN2021/090004
§ 371 (c)(1),
(2) Date: Oct. 20, 2022

(87) PCT Pub. No.: WO2022/217649
PCT Pub. Date: Oct. 20, 2022

(65) Prior Publication Data
US 2024/0021111 A1  Jan. 18, 2024

(30) Foreign Application Priority Data
Apr. 13, 2021 (CN) .......................... 202110396784.4

(51) Int. Cl.
G09F 9/30 (2006.01)
B32B 7/022 (2019.01)
(Continued)

(52) U.S. Cl.
CPC .............. *G09F 9/301* (2013.01); *B32B 7/022* (2019.01); *B32B 7/05* (2019.01); *B32B 37/12* (2013.01);
(Continued)

(58) Field of Classification Search
None
See application file for complete search history.

(56) References Cited

U.S. PATENT DOCUMENTS

2011/0149211 A1* 6/2011 Ha ........................... B05D 5/10
359/483.01
2014/0295150 A1* 10/2014 Bower .................... B32B 25/20
428/411.1
(Continued)

FOREIGN PATENT DOCUMENTS

| CN | 105870149 | 8/2016 |
| CN | 107331795 | 11/2017 |

(Continued)

*Primary Examiner* — Eli D. Strah (57) ABSTRACT

Embodiments of the application discloses a display module, a manufacturing method thereof, and a display device, wherein the display module includes a display panel, a functional layer, and a sealant layer disposed on the display panel, the sealant layer includes a first sealant section spaced apart from the functional layer and a second sealant section filled between the first sealant section and the functional layer, and an elastic modulus of the second sealant section is smaller than an elastic modulus of the first sealant section.

17 Claims, 7 Drawing Sheets

(51) Int. Cl.
*B32B 7/05* (2019.01)
*B32B 37/12* (2006.01)

(52) U.S. Cl.
CPC ............ *B32B 2037/1253* (2013.01); *B32B 2037/1269* (2013.01); *B32B 2307/51* (2013.01); *B32B 2457/20* (2013.01)

(56) References Cited

U.S. PATENT DOCUMENTS

2018/0182829 A1    6/2018  Shin
2022/0384746 A1*  12/2022  Wang ................. H10K 50/86

FOREIGN PATENT DOCUMENTS

| CN | 108962026   | 12/2018 |
| CN | 209515666   | 10/2019 |
| CN | 110491883   | 11/2019 |
| CN | 111446278   |  7/2020 |
| CN | 111933611   | 11/2020 |
| CN | 112164712   |  1/2021 |
| CN | 112164712 A * | 1/2021 |

\* cited by examiner

FIG. 4 providing a display panel, wherein the display panel comprises a display area, a non-display area adjacent to the display area, a display functional portion located in the display area, and a bent wiring portion located in the non-display area; ⎯ S100 forming a functional layer on the display panel; ⎯ S200 forming a sealant layer on the display panel in the non-display area, wherein the sealant layer comprises a first sealant section spaced apart from the functional layer and a second sealant section filled between the first sealant section and the functional layer, and an elastic modulus of the second sealant section is smaller than an elastic modulus of elasticity of the first sealant section. ⎯ S300

DISPLAY MODULE, MANUFACTURING METHOD THEREOF, AND DISPLAY DEVICE

RELATED APPLICATIONS

This application is a National Phase of PCT Patent Application No. PCT/CN2021/090004 having International filing date of Apr. 26, 2021, which claims the benefit of priority of Chinese Patent Application No. 202110396784.4 filed on Apr. 13, 2021. The contents of the above applications are all incorporated by reference as if fully set forth herein in their entirety.

FIELD AND BACKGROUND OF THE INVENTION

The present application relates to the field of display, and in particular to a display module, a manufacturing method thereof, and a display device.

Pad bending technology is a main technical means to realize a display module with a narrow bezel, which realizes the narrow bezel mainly by bending a part of the display module in a non-display area.

At present, in order to prevent the display module from being damaged during bending in a relevant area of pad bending, such as wiring and other related structures, a layer of protective glue is usually used to cover the wiring and other structures. Such a structure easily makes the protective glue adhere to a film structure such as a polarizer in the display module, resulting in excessive local stress at a junction between the film structure such as the polarizer and the protective glue during a pad bending process, and the local stress exists for a long time and cannot be effectively released, thus impacting device performance and service life of a flexible display module.

SUMMARY OF THE INVENTION

Embodiments of the present application provide a display module, a manufacturing method thereof, and a display device, so as to solve a technical problem of excessive local stress at a junction between a film structure such as a polarizer and a protective glue during a pad bending process of an existing display module.

An embodiment of the present application provides a display module, including:
  a display panel including a display area, a non-display area adjacent to the display area, a display functional portion located in the display area, and a bent wiring portion located in the non-display area;
  a functional layer disposed on the display panel;
  a sealant layer disposed on the bent wiring portion and located in the non-display area,
  wherein the sealant layer includes a first sealant section spaced apart from the functional layer and a second sealant section filled between the first sealant section and the functional layer, and an elastic modulus of the second sealant section is smaller than an elastic modulus of the first sealant section.

In the display module according to an embodiment of the present application, wherein the first sealant section and the second sealant section are made of same material, the first sealant section and the second sealant section are an integral structure, and a curing rate of the second sealant section is slower than a curing rate of the first sealant section.

In the display module according to an embodiment of the present application, a material of the second sealant section is different from a material of the first sealant section, and an elastic modulus of the material of the second sealant section is smaller than an elastic modulus of the material of the first sealant section.

In the display module according to an embodiment of the present application, one end of the second sealant section is bonded to the functional layer, and another end of the second sealant section extends to the first sealant section and at least partially covers the first sealant section.

In the display module according to an embodiment of the present application, the bent wiring portion includes a first wiring section adjacent to the display functional portion, a bent wiring section disposed at one end of the first wiring section away from the display functional portion, and a second wiring section disposed at one end of the bent wiring section away from the first wiring section; and the first sealant section is disposed on the bent wiring section and covers the bent wiring section.

In the display module according to an embodiment of the present application, the display module further includes a backplane disposed on a side of the display panel away from the sealant layer, the backplane includes a first backplane and a second backplane, an interval section corresponding to a position of the bent wiring section is provided between the first backplane and the second backplane, and a length of the interval section is less than or equal to a length of the bent wiring section.

In the display module according to an embodiment of the present application, the display functional portion includes at least one bent display section, and the elastic modulus of the second sealant section is less than or equal to 60% of the elastic modulus of the first sealant section.

Correspondingly, an embodiment of the present application also provides a method of manufacturing a display module, which includes the following steps:
  providing a display panel, wherein the display panel includes a display area, a non-display area adjacent to the display area, a display functional portion located in the display area, and a bent wiring portion located in the non-display area;
  forming a functional layer on the display panel;
  forming a sealant layer on the display panel in the non-display area, wherein the sealant layer includes a first sealant section spaced apart from the functional layer and a second sealant section filled between the first sealant section and the functional layer, and an elastic modulus of the second sealant section is smaller than an elastic modulus of elastic modulus of the first sealant section.

In the method of manufacturing the display module according to an embodiment of the present application, the step of forming a sealant layer on the display panel in the non-display area includes:
  forming a photosensitive adhesive layer on the display panel in the non-display area and in contact with the functional layer;
  performing a light curing step to cure the photosensitive adhesive layer to form the sealant layer, wherein the photosensitive adhesive layer includes a first sub-adhesive spaced apart from the functional layer and a second sub-adhesive located between the first sub-adhesive and the functional layer, a light irradiation duration of the second sub-adhesive is less than a light irradiation duration of the first sub-adhesive, so that the elastic modulus of the second sealant section formed by curing the second sub-adhesive is smaller than the elastic modulus of the first sealant section formed by curing the first sub-adhesive.

In the method of manufacturing the display module according to an embodiment of the present application, the step of forming a sealant layer on the display panel in the non-display area includes:

forming a first photosensitive adhesive layer on the display panel in the non-display area and spaced apart from the functional layer, and curing the first photosensitive adhesive layer by a first curing step to form a first sealant section;

forming a second photosensitive adhesive layer on the display panel in the non-display area and filled between the first sealant section and the functional layer, and curing the second photosensitive adhesive by a second curing step to form a second sealant section, so that the sealant layer including the first sealant section and the second sealant section is obtained, wherein a curing agent in the second photosensitive adhesive layer has a larger proportion than a curing agent in the first photosensitive adhesive layer.

Correspondingly, an embodiment of the present application further provides a display device, including:

a display panel including a display area, a non-display area adjacent to the display area, a display functional portion located in the display area, and a bent wiring portion located in the non-display area;

a functional layer disposed on the display panel;

a sealant layer disposed on the bent wiring portion and located in the non-display area, wherein the sealant layer includes a first sealant section spaced apart from the functional layer and a second sealant section filled between the first sealant section and the functional layer, and an elastic modulus of the second sealant section is smaller than an elastic modulus of the first sealant section.

In the display device according to an embodiment of the present application, wherein the first sealant section and the second sealant section are made of same material, the first sealant section and the second sealant section are an integral structure, and a curing rate of the second sealant section is slower than a curing rate of the first sealant section.

In the display device according to an embodiment of the present application, a material of the second sealant section is different from a material of the first sealant section, and an elastic modulus of the material of the second sealant section is smaller than an elastic modulus of the material of the first sealant section.

In the display device according to an embodiment of the present application, one end of the second sealant section is bonded to the functional layer, and another end of the second sealant section extends to the first sealant section and at least partially covers the first sealant section.

In the display device according to an embodiment of the present application, the bent wiring portion includes a first wiring section adjacent to the display functional portion, a bent wiring section disposed at one end of the first wiring section away from the display functional portion, and a second wiring section disposed at one end of the bent wiring section away from the first wiring section; and the first sealant section is disposed on the bent wiring section and covers the bent wiring section.

In the display device according to an embodiment of the present application, the display device further includes a backplane disposed on a side of the display panel away from the sealant layer, the backplane includes a first backplane and a second backplane, an interval section corresponding to a position of the bent wiring section is provided between the first backplane and the second backplane, and a length of the interval section is less than or equal to a length of the bent wiring section.

In the display device according to an embodiment of the present application, the display functional portion includes at least one bent display section, and the elastic modulus of the second sealant section is less than or equal to 60% of the elastic modulus of the first sealant section.

The beneficial effects of the present application are as follows: in the embodiments of the present application, the sealant layer provided on the bent wiring portion is divided into a first sealant section and a second sealant section, and an elastic modulus of the second sealant section that is bonded to the functional layer 30 is smaller than an elastic modulus of the first sealant section spaced apart from the functional layer, so that the second sealant section bonded to the functional layer has better ductility compared with the first sealant section, so that during a bending process of the bent wiring portion, a stress generated at a junction between the functional layer and the second sealant section can be well released.

BRIEF DESCRIPTION OF THE SEVERAL VIEWS OF THE DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DESCRIPTION OF SPECIFIC EMBODIMENTS OF THE INVENTION

The following description of the various embodiments is provided to illustrate the specific embodiments of the invention. Directional terms mentioned in the present invention, such as "vertical", "horizontal", "upper", "bottom", "pre", "post", "left", "right", "inside", "outside", "side", etc., only refer to the direction of the additional drawing. Therefore, the directional terminology used is for the purpose of illustration and understanding of the invention. In the drawings, structurally similar elements are denoted by the same reference numerals.

In the description of this application, it should be understood that the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless specifically defined otherwise.

In the description of the present invention, it should be noted that the terms "installation", "connection", and "bonding" are to be understood broadly unless otherwise explicitly defined and limited. For example, it may be fixed connection, detachable connection, or integrally connection; being mechanical or electrical connection; also, being directly connection, indirectly connection through an intermediate medium, or internal communication of two components. The specific meaning of the above terms in the present invention can be understood in a specific case by those skilled in the art.

The technical solution of the present application will now be described in conjunction with specific embodiments.

Figure 1:
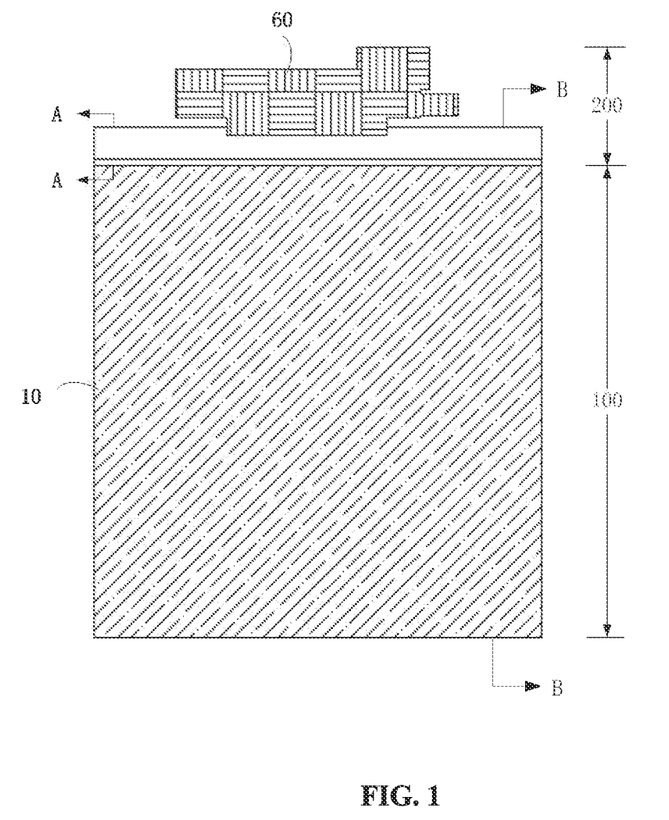
FIG. 1 is a top view of a display module provided by an embodiment of the present application.
Figure 2:
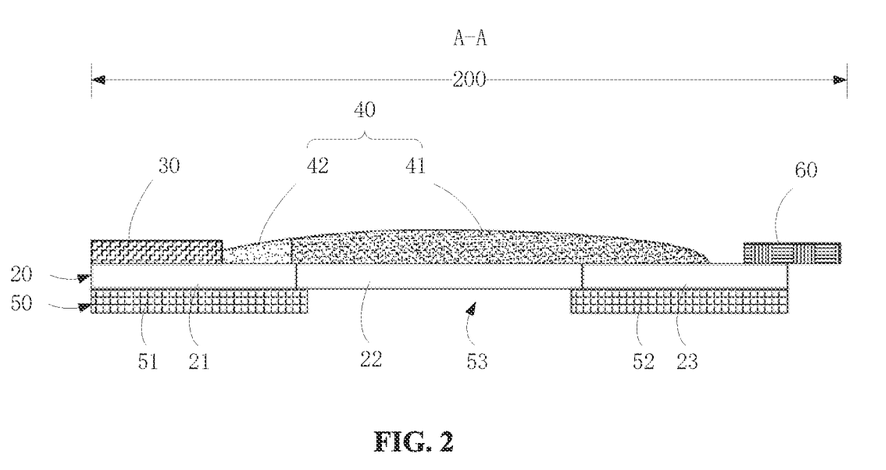
FIG. 2 is a schematic diagram of a cross-sectional structure along line A-A in FIG. 1.
Figure 3:
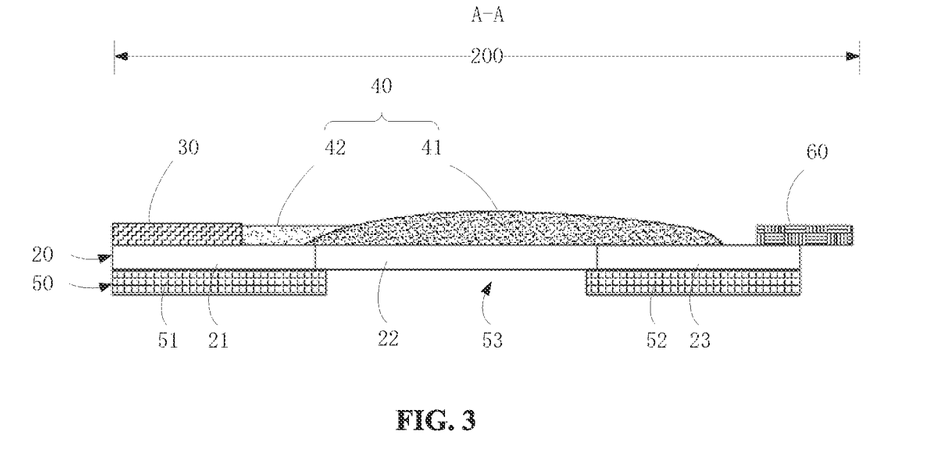
FIG. 3 is a schematic diagram of another cross-sectional structure along line A-A in FIG. 1.

Referring to FIG. 1 to FIG. 3, an embodiment of the present application provides a display module, including:
 a display panel including a display area 100 and a non-display area 200 adjacent to the display area 100. The display panel includes a display functional portion located in the display area 100 and a bent wiring portion 20 located in the non-display area 200;
 a functional layer 30 arranged on the display panel;
 a sealant layer 40 disposed on the bent wiring portion 20 and located in the non-display area 200,
 wherein the sealant layer 40 includes a first sealant section 41 spaced apart from the functional layer 30 and a second sealant section 42 filled between the first sealant section 41 and the functional layer 30, and an elastic modulus of the second sealant section 42 is smaller than an elastic modulus of the first sealant section 41.

In one embodiment, pad bending technology is a main technical means to realize a display module with a narrow bezel, which realizes the narrow bezel mainly by bending a part of the display module in a non-display area. At present, in order to prevent the display module from being damaged during bending in a relevant area of pad bending, such as wiring and other related structures, a layer of protective glue is usually used to cover the wiring and other structures. Such a structure easily makes the protective glue adhere to a film structure such as a polarizer in the display module, resulting in excessive local stress at a junction between the film structure such as the polarizer and the protective glue during a pad bending process, and the local stress exists for a long time and cannot be effectively released, thus impacting device performance and service life of a flexible display module. In the embodiment of the present application, the sealant layer 40 provided on the bent wiring portion 20 is divided into a first sealant section 41 and a second sealant section 42, and an elastic modulus of the second sealant section that is bonded to the functional layer 30 is smaller than an elastic modulus of the first sealant section 41 spaced apart from the functional layer 30, so that the second sealant section 42 bonded to the functional layer 30 has better ductility compared with the first sealant section 41, so that during a bending process of the bent wiring portion 20, a stress generated at a junction between the functional layer 30 and the second sealant section 42 can be well released. In this embodiment, the elastic modulus of the second sealant section 42 is less than or equal to 80% of the elastic modulus of the first sealant section 41. Specifically, the elastic modulus of the first sealant section 41 is 500 Mpa, and the elastic modulus of the second sealant section 42 is less than or equal to 400 Mpa. A distance between the functional layer 30 and the first sealant section 41 is 0 to 0.5 mm, and the second sealant section 42 is at least filled between the first sealant section 41 and the functional layer 30. Furthermore, the second sealant section 42 is filled between the first sealant section 41 and the functional layer 30, so that the first sealant section 41 and the second sealant section 42 can cover the bent wiring portion 20 as much as possible. There is no gap transition between the second sealant section 42 in the sealant layer 40 and the functional layer 30, so that there is no exposed portion in the bent wiring portion 20, that is, the electrostatic protection of the wiring in the bent wiring portion 20 can be realized.

It should be noted that the functional layer 30 is a layer attached to the display panel through an adhesive layer, and it may be, for example, an optical film such as a polarizer, or a touch functional layer with touch function, or a hard or soft membrane with protective function, which is not particularly limited herein.

In one embodiment, referring to FIG. 2, the first sealant section 41 and the second sealant section 42 are made of the same material, and the first sealant section 41 and the second sealant section 42 are an integral structure, wherein a curing rate of the second sealant section 42 is less than a curing rate of the first sealant section 41.

The first sealant section 41 and the second sealant section 42 can be made of the same material, and the first sealant section 41 and the second sealant section 42 can be made by the same process to form an integral structure, with the curing rate of the second sealant section 42 being lower than that of the first sealant section 41. Specifically, the first sealant section 41 and the second sealant section 42 can be made of a material such as photosensitive adhesive, and both can be formed by adopting a light curing step to cure the photosensitive adhesive, wherein the elastic modulus of the second sealant section 42 is smaller than the elastic modulus of the first sealant section 41. The elastic modulus of the first sealant section 41 can be adjusted by adjusting the light curing energy received by the photosensitive adhesive for the first sealant section 41 and the photosensitive adhesive for the second sealant section 42, so that the curing rate of the photosensitive adhesive for the first sealant section 41 and the curing rate of the photosensitive adhesive for the second sealant section 42 are different, so that the elastic modulus of the second sealant section 42 is smaller than the elastic modulus of the first sealant section 41.

Furthermore, in one embodiment, the curing energy of the photosensitive adhesive material is about 3500-4500 mJ/cm2. By controlling the energy received by the photosensitive adhesive for the first sealant section 41 to be greater than or equal to 90% of the curing energy of the photosensitive adhesive material, the curing rate of the photosensitive adhesive for the first sealant section 41 is greater than 90%, so that the first sealant section 41 is nearly completely cured. In addition, by controlling the energy received by the photosensitive adhesive for the second sealant section 42 to be less than 90% of the curing energy of the photosensitive adhesive material, the curing rate of the photosensitive adhesive for the second sealant section 42 is less than 90%, so that the second sealant section 42 is similar to a semi-cured state, thereby realizing that the elastic modulus of the second sealant section 42 is smaller than the elastic modulus of the first sealant section 41.

Furthermore, under the same light intensity, by adjusting a light irradiation duration for the photosensitive adhesive for the second sealant section 42 and the photosensitive adhesive for the second sealant section 42, the elastic modulus of the second sealant section 42 can be adjusted to be smaller than the elastic modulus of the first sealant section 41. For example, the light irradiation duration received by the photosensitive adhesive of the second sealant section 42 can be less than the light irradiation duration received by the photosensitive adhesive of the first sealant section 41, which will not be repeated herein for brevity.

In one embodiment, referring to FIG. 3, the material of the second sealant section 42 is different from the material of the first sealant section 41, and the elastic modulus of the material of the second sealant section 42 is smaller than the elastic modulus of the material of the first sealant section 41.

The first sealant section 41 and the second sealant section 42 can be made of different materials in a section-wise manner, so that the elastic modulus of the material of the second sealant section 42 can be smaller than that of the material of the first sealant section 41. Specifically, the first sealant section 41 and the second sealant section 42 may be made of different materials, and the first sealant section 41 and the second sealant section 42 may be made of materials with different elastic modulus, respectively. Alternatively, the first sealant section 41 and the second sealant section 42 may be made of materials mixed with different components, or mixed with the same components with different mixing ratios.

Further, by adjusting a proportion of a curing agent in the photosensitive adhesive for the first sealant section 41 and the photosensitive adhesive for the second sealant section 42, the elastic modulus of the first sealant section 41 and the elastic modulus of the second sealant section 42 may be different. Specifically, the proportion of the curing agent in the photosensitive adhesive for the first sealant section 41 can be greater than the proportion of the curing agent in the photosensitive adhesive for the second sealant section 42. Obviously, under the same light curing conditions, the elastic modulus of the cured second sealant section 42 is smaller than the elastic modulus of the cured first sealant section 41.

In one embodiment, referring to FIG. 3, one end of the second sealant section 42 is bonded to the functional layer 30, and another end of the second sealant section 42 extends to the first sealant section 41 and at least partially covers the first sealant section 41. During the bending process of the bent wiring portion 20, a relatively large local stress will be generated at the second sealant section 42. In this embodiment, by making the elastic modulus of the second sealant section 42 smaller than the elastic modulus of the first sealant section 41, the second sealant section 42 is easier to have a certain deformation relative to the first sealant section 41, thereby releasing the local stress generated at the second sealant section 42 when the bent wiring portion 20 is bent. In such a process, the end of the second sealant section 42 away from the functional layer 30 is configured to extend to the first sealant section 41 and at least partially covers the first sealant section 41. A transition zone with a gradual elastic modulus can be formed at an overlapped area between the second sealant section 42 and the first sealant section 41, so that the first sealant section 41 and the second sealant section 42 are more integrated, thus achieving a better release effect on local stress. In one embodiment, referring to FIG. 2 to FIG. 3, the bent wiring portion 20 includes a first wiring section 21 adjacent to the display functional portion 10, a bent wiring section 22 disposed at one end of the first wiring section 21 away from the display functional portion 10, and a second wiring section 23 disposed at one end of the bent wiring section 22 away from the first wiring section 21. The first sealant section 41 is disposed on the bent wiring portion 20 and covers the bent wiring section 22. Obviously, during the pad bending process of the display panel, the bent wiring portion 20 will also be bent at a position of the bent wiring section 22, and by placing the first sealant section 41 on the bent wiring portion 20 and covering the bent wiring section 22, that is, by making the first sealant section 41 completely cover the bent wiring section 22, protection for an entire surface of the bent wiring section 22 is achieved.

In one embodiment, referring to FIG. 2 to FIG. 3, the display module further includes a backplane 50 disposed on a side of the display panel away from the sealant layer 40, and the backplane 50 includes a first backplane 51 and a second backplane 52. An interval section 53 corresponding to a position of the bent wiring section 22 is disposed between the first backplane 51 and the second backplane 52, and a length of the interval section 53 is less than or equal to a length of the bent wiring section 22. Specifically, the first backplane 51 may be disposed at least at positions corresponding to the display functional portion 10 and the first wiring section 21, and the second backplane 52 may be arranged at least at a position corresponding to the second wiring section 23, that is, the first backplane 51 is used to support at least the display functional portion 10 and the first wiring section 21, and the second backplanes 52 are used to support at least the second wiring section 23.

Obviously, the length of the interval section 53 is less than or equal to the length of the bent wiring section 22. When the length of the interval section 53 is equal to the length of the bent wiring section 22, the position of the interval section 53 completely corresponds to the position of the bent wiring section 22, that is, the first backplane 51 and the second backplane 52 do not extend below the bent wiring section 22, and the first backplane 51 and the second backplane 52 are just used to support the display functional portion 10, the first wiring section 21, and the second wiring section 23.

In addition, when the length of the interval section 53 is less than the length of the bent wiring section 22, it can be understood that the first backplane 51 and the second backplane 52 both partially extend below the bent wiring section 22. In such a case, the first backplane 51 and the second backplane 52 not only support the display functional portion 10, but also can support the bent wiring section 22 to a certain extent during bending, thereby reducing the overall stress borne by the first sealant section 41 and the second sealant section 42, especially reducing magnitude of the stress to be released from the second sealant section 42 so as to prevent excessive stress to be released from the second sealant section 42 from causing excessive deformation. Specifically, the length of each of the first backplane 51 and the second backplane 52 extending below the bent wiring section 22 may be less than or equal to 20% of the entire length of the bent wiring section 22, and the length of the first backplane 51 and the length of the second backplane 52 extending below the bent wiring section 22 may be equal, so as to maximize the effectiveness of supporting the bent wiring section 22 without affecting the bending condition of the bent wiring section 22.

Figure 8:
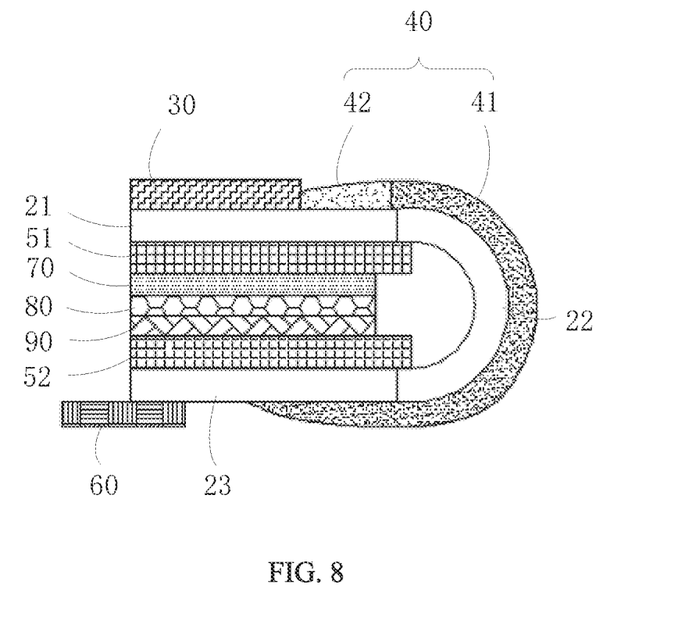
FIG. 8 is a schematic structural diagram of a display device provided by an embodiment of the present application.

In addition, when the bent wiring portion 20 is bent at the position of the bent wiring section 22, the second wiring section 23 and the second backplane 52 will be driven with the bending of the bent wiring section 22 to bend to a position opposite to the first backplane 51. Referring to FIG. 8, a foam layer 70, a rigid substrate 80, and a reinforcing plate 90 are further disposed between the first backplane 51 and the second backplane 52, and a flexible printed circuit (FPC) 60 is also provided on the second wiring section 23.

Figure 4:
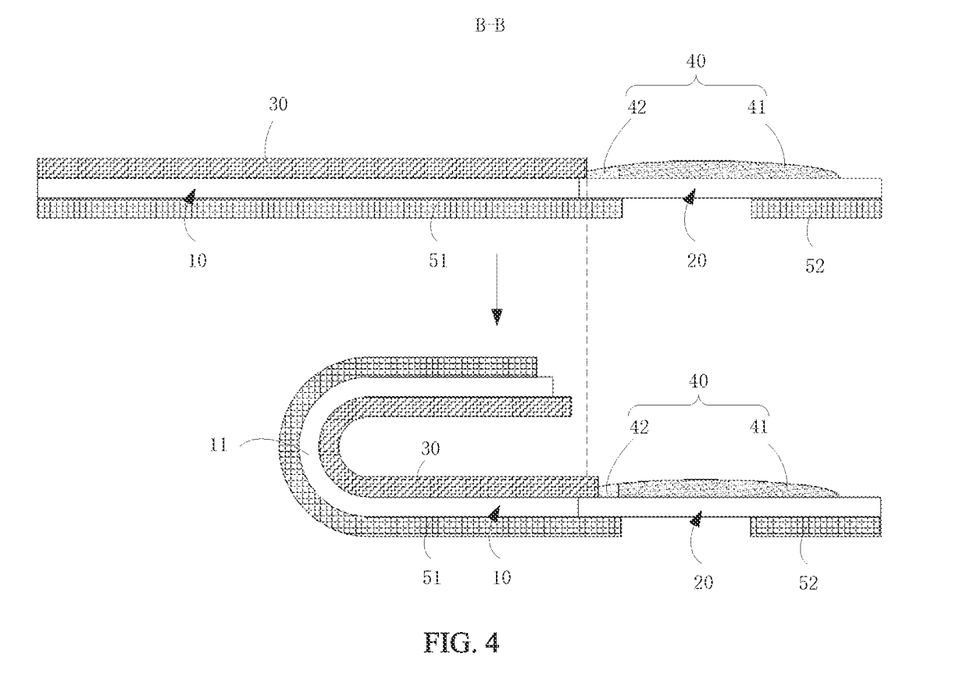
FIG. 4 is a schematic diagram of another cross-sectional structure showing a display functional portion along line B-B in FIG. 1 before and after bending.

In one embodiment, referring to FIG. 4, the display functional portion 10 includes at least one bent display section 11, and the elastic modulus of the second sealant section 42 is less than or equal to the elastic modulus of the first sealant section 41. It is appreciated that the display functional portion 10 includes at least one bent display section 11, and the display functional portion 10 can be dynamically bent at the position of the bent display section 11, that is, the display module is a flexible display module with flexible display functions such as bendable display. In the process of dynamic bending of the flexible display module, due to the large bending amplitude of the display module, a film structure such as a polarizer in the flexible display module will have a large dislocation, which will cause excessive local stress at the junction between the film structure such as the polarizer and the protective glue, and the magnitude of stress on the protective glue will continue to change with the dynamic bending of the flexible display module, thus causing stress to exist for a long time and cannot be effectively released, which impacts the device performance and service life of the flexible display module. In this embodiment, the elastic modulus of the second sealant section 42 is less than or equal to 60% of the elastic modulus of the first sealant section 41. It should be noted that, compared to pad bending, when the display functional portion 10 is dynamically bent at the position of the bent display section 11, greater stress will be generated at the junction between the functional layer 30 and the second sealant section 42. Therefore, a larger difference between the elastic modulus of the second sealant section 42 and the elastic modulus of the first sealant section 41 is required, so that the second sealant section 42 can better release the stress generated by the bending of the display module at various positions. Obviously, when the elastic modulus of the first sealant section 41 is constant, the elastic modulus of the second sealant section 42 can be further reduced. Specifically, the elastic modulus of the first sealant section 41 is 500 Mpa, and the elastic modulus of the second sealant section 42 is less than or equal to 300 Mpa.

Figure 5:
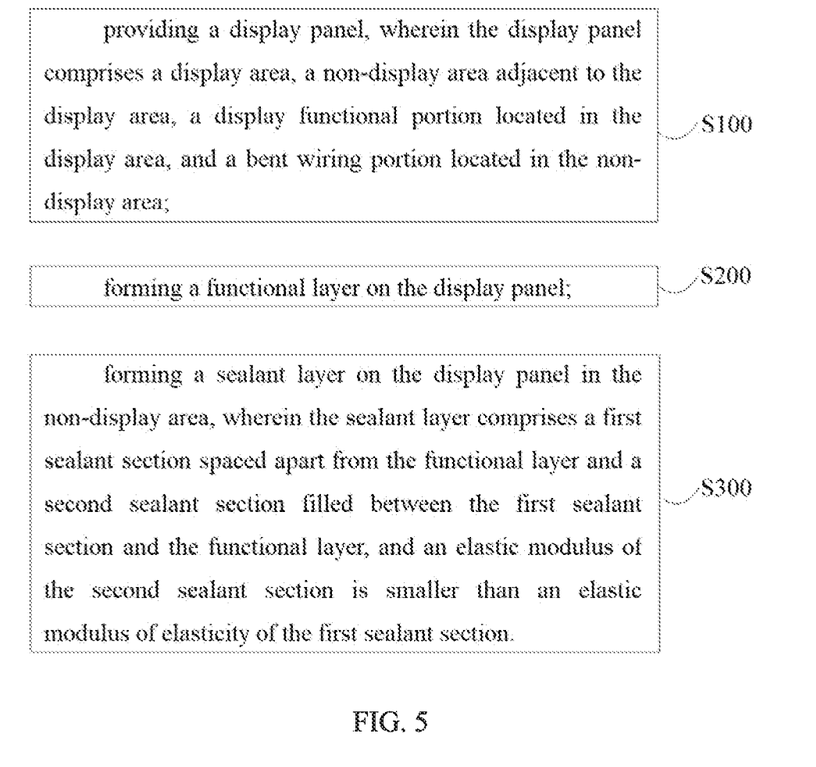
FIG. 5 is a schematic block diagram of a process flow of a method of manufacturing a display module provided by an embodiment of the present application.
Figure 6A:
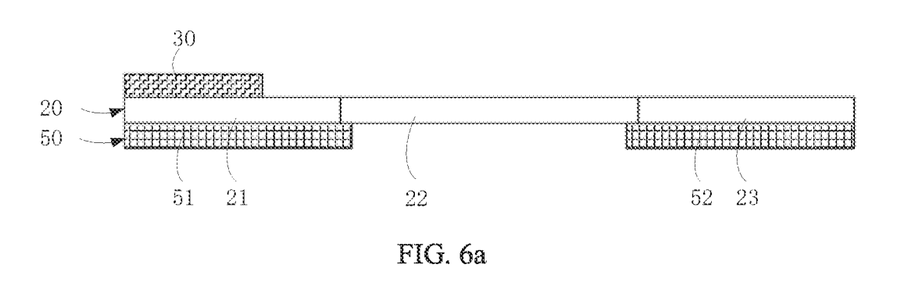
FIGS. 6a, 6b, 6c, 6d and 6e are schematic structural diagrams of the process flow of the method of manufacturing the display module provided by an embodiment of the present application.
Figure 6B:
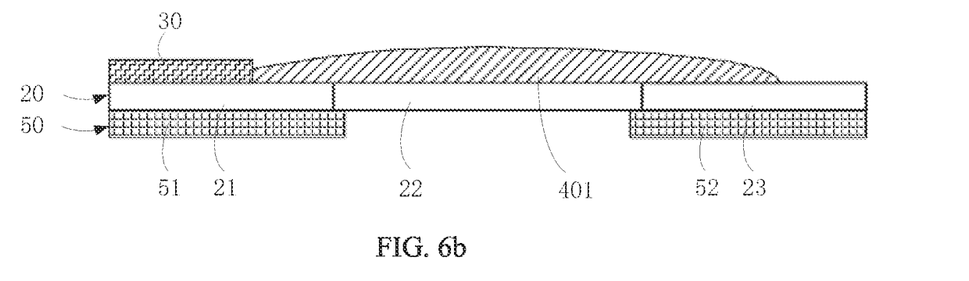
Figure 6C:
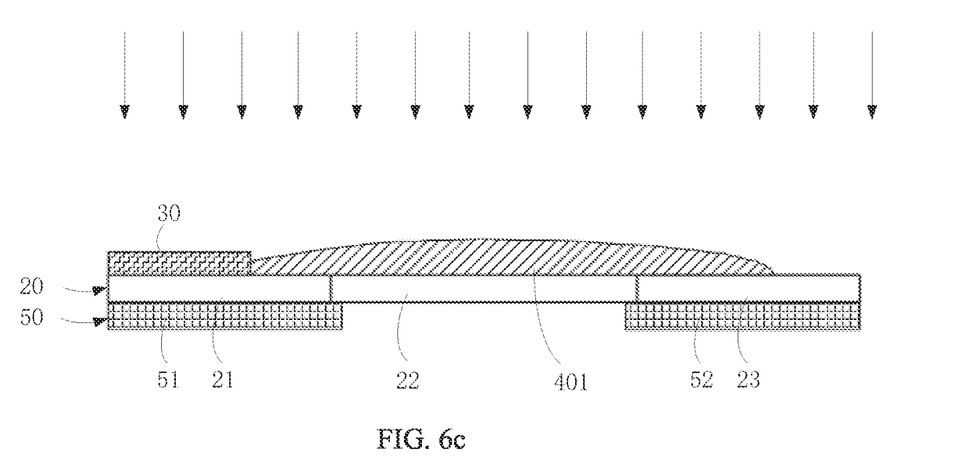
Figure 6D:
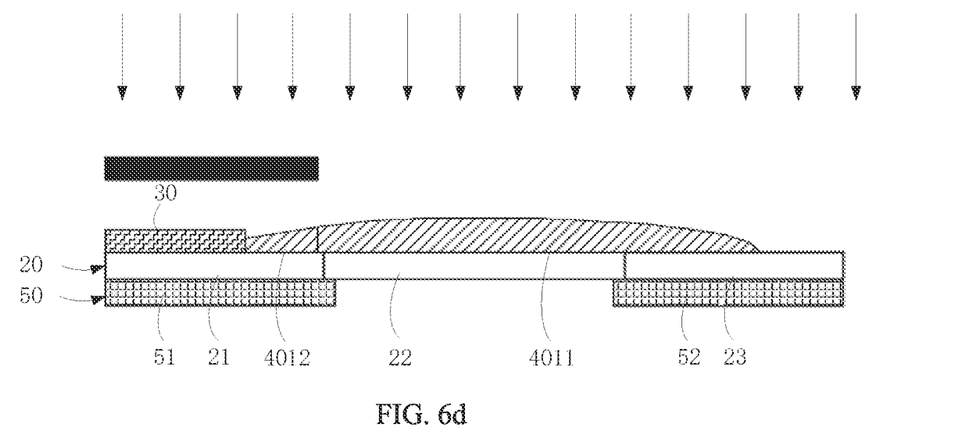
Figure 6E:
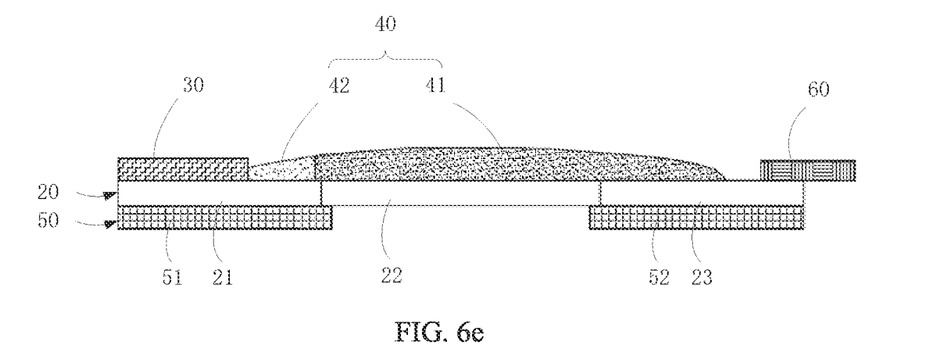
Figure 7A:
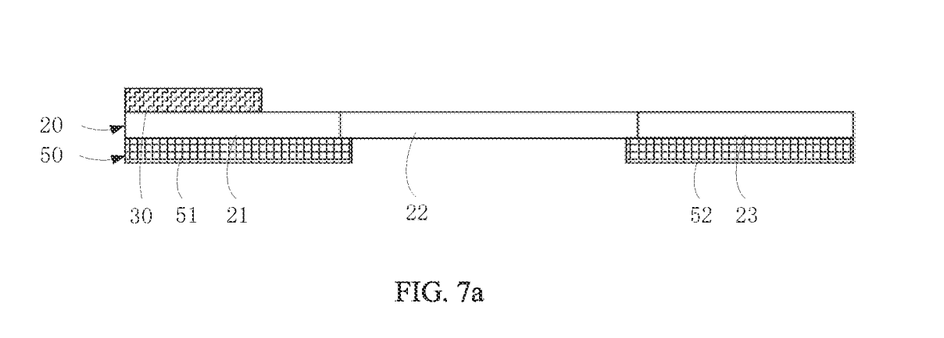
FIGS. 7a, 7b, 7c, 7d and 7e are schematic structural diagrams of another process flow of the method of manufacturing the display module provided by an embodiment of the present application.
Figure 7B:
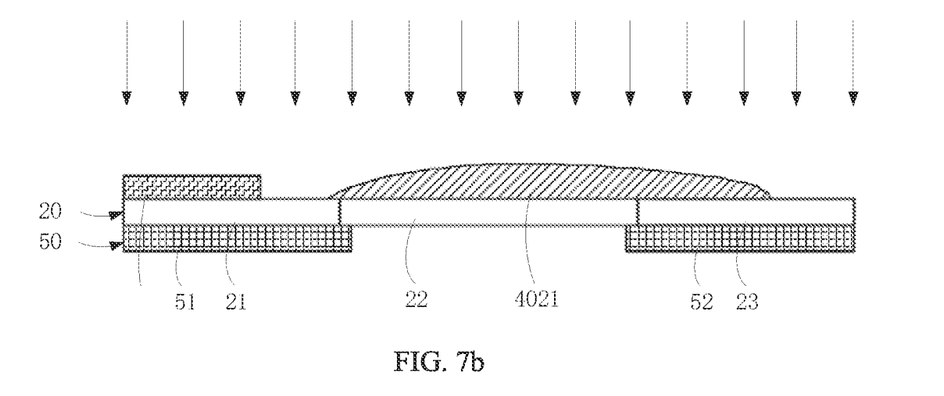
Figure 7C:
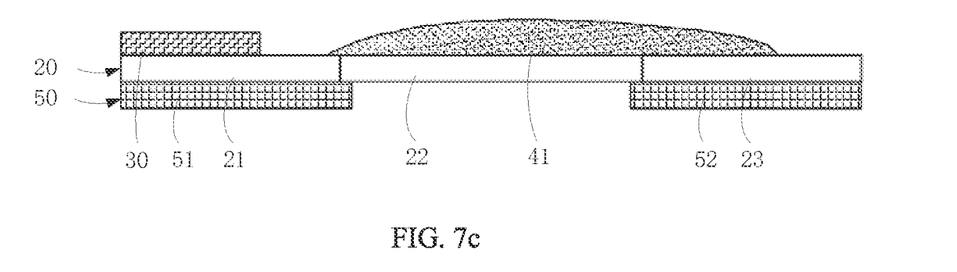
Figure 7D:
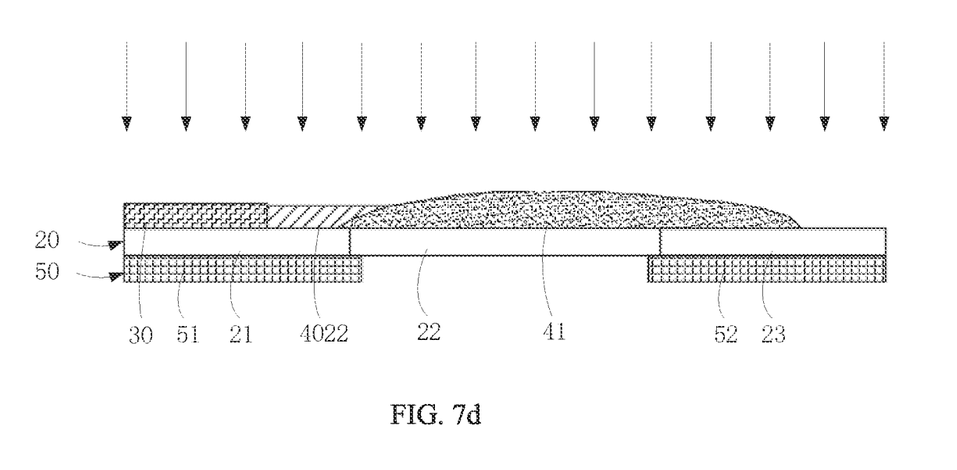
Figure 7E:
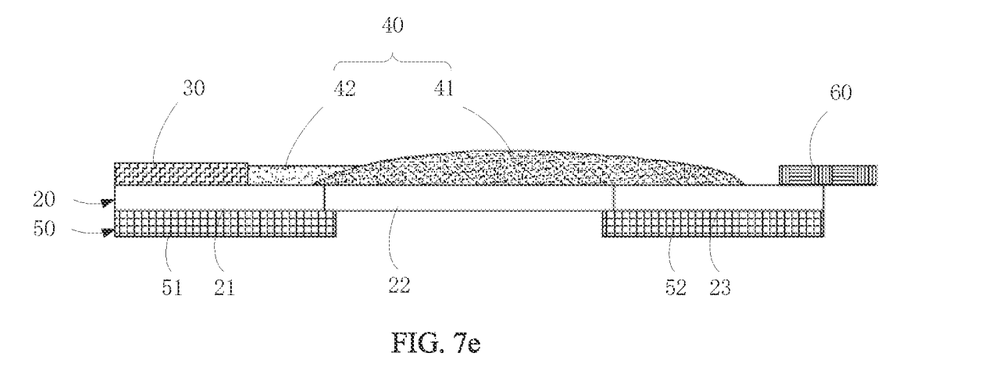

It should be noted that the functional layer 30 is disposed on the display panel and covers at least the display area 100, that is, the functional layer 30 not only coincides with the position of the display area 100, but also extends from the display area 100 to the non-display area 200. Obviously, during the bending process of the display functional portion 10, in order to prevent the functional layer 30 from being unable to completely cover the display area 100 due to dislocation, which impacts the normal display of the display module, in the embodiment of the present application, the functional layer 30 may completely cover the display area 100 and extend from the display area 100 into the non-display area 200. In addition, the display functional portion 10 may be bent, folded, or curled specifically at the position of the bent display section 11, which will not be repeated herein for brevity. In addition, to facilitate the dynamic bending of the display functional portion 10, the first backplane 51 may be a flexible backplane that is bendable. Specifically, the material of the first backplane 51 may be a flexible material such as polyimide. An embodiment of the present application also provides a method of manufacturing a display module, referring to FIG. 5, which includes the following steps:

S100: providing a display panel, wherein the display panel includes a display area 100, a non-display area 200 adjacent to the display area 100, a display functional portion 10 located in the display area 100, and a bent wiring portion 20 located in the non-display area 200;

S200: forming a functional layer 30 on the display panel; and

S300: forming a sealant layer 40 on the display panel in the non-display area 200, wherein the sealant layer 40 includes a first sealant section 41 spaced apart from the functional layer 30 and a second sealant section 42 filled between the first sealant section 41 and the functional layer 30, and an elastic modulus of the second sealant section 42 is smaller than an elastic modulus of the first sealant section 41.

In the process of forming the sealant layer 40 on the display panel in the non-display area 200, the first sealant section 41 and the second sealant section 42 in the sealant layer 40 may be integrally formed by the same manufacturing process. Alternatively, the first sealant section 41 and the second sealant section 42 may be manufactured in a sectionwise manner, so that the elastic modulus of the formed second sealant section 42 is smaller than the elastic modulus of the first sealant section 41, such that during the bending process of the bent wiring portion 20, the second sealant section 42 adhered to the functional layer 30 has better ductility compared to the first sealant section 41, and thereby during the bending process of the bent wiring portion 20, the stress generated at a junction with the second sealant section 42 due to a larger dislocation of the functional layer 30 can be well released. In one embodiment, referring to FIGS. 6a-6e, the step of forming the sealant layer 40 on the display panel in the non-display area 200 includes:

forming a photosensitive adhesive layer 401 on the display panel in the non-display area 200 and in contact with the functional layer 30;

performing a light curing step to cure the photosensitive adhesive layer 401 to form the sealant layer 40, wherein the photosensitive adhesive layer 401 includes a first sub-adhesive 4011 spaced apart from the functional layer 30 and a second sub-adhesive 4012 located between the first sub-adhesive 4011 and the functional layer 30, a light irradiation duration of the second sub-adhesive 4012 is less than a light irradiation duration of the first sub-adhesive 4011, so that the elastic modulus of the second sealant section 42 formed by curing the second sub-adhesive 4012 is smaller than the elastic modulus of the first sealant section 41 formed by curing the first sub-adhesive 4011.

The light curing step is performed to cure the photosensitive adhesive layer 401 to form the sealant layer 40, that is, the first sealant section 41 and the second sealant section 42 in the sealant layer 40 are integrally formed in the same manufacturing process. Obviously, in order to ensure that the elastic modulus of the second sealant section 42 is less than the elastic modulus of the first sealant section 41, during the light curing process, by adjusting the light irradiation duration of the second sub-adhesive 4012 to be less than the light irradiation duration of the first sub-adhesive 4011, so that the light curing energy received by the second sub-adhesive 4012 is less than the light curing energy received by the first sub-adhesive 4011, the first sub-adhesive 4011 for the first sealant section 41 is completely cured, and the second sub-adhesive 4012 for the second sealant section 42 is in a semi-cured state. Specifically, in one curing cycle of light curing the first sealant section 41 and the second sealant section 42, a mask is used to shield the second sub-adhesive 4012 during a part of the curing cycle.

In one embodiment, referring to FIGS. 7a-7e, the step of forming the sealant layer 40 on the display panel in the non-display area 200 includes:

forming a first photosensitive adhesive layer 4021 on the display panel in the non-display area 200 and spaced apart from the functional layer 30, and curing the first photosensitive adhesive layer 4021 by a first curing step to form a first sealant section 41; and forming a second photosensitive adhesive layer 4022 on the display panel in the non-display area 200 and filled between the first sealant section 41 and the functional layer 30, and curing the second photosensitive adhesive 4022 by a second curing step to form a second sealant section 42, so that the sealant layer 40 including the first sealant section 41 and the second sealant section 42 is obtained, wherein a curing agent in the second photosensitive adhesive layer 4022 has a larger proportion than a curing agent in the first photosensitive adhesive layer 4021.

The proportion of the curing agent in the second photosensitive adhesive layer 4022 is greater than the proportion of the curing agent in the first photosensitive adhesive layer 4021, that is, the elastic modulus of the second sealant section 42 formed after curing is less than the elastic modulus of the first sealant section 41, and a first curing step and a second curing step are used to cure the first photosensitive adhesive layer 4021 to form the first sealant section 41 and cure the second photosensitive adhesive layer 4022 to form the second sealant section 42, respectively, that is, the first sealant section 41 and the second sealant section 42 in the sealant layer 40 are manufactured in a section-wise manner, Specifically, the first curing step and the second curing step can be performed by either ultraviolet light irradiation curing or heat curing.

An embodiment of the present application also provides a display device. Referring to FIG. 8, the display device includes the display module as described in any one of the previous embodiments.

In the present application, the sealant layer 40 provided on the bent wiring portion 20 is divided into a first sealant section 41 and a second sealant section 42, and an elastic modulus of the second sealant section that is bonded to the functional layer is smaller than an elastic modulus of the first sealant section 41 spaced apart from the functional layer 30, so that the second sealant section 42 bonded to the functional layer 30 has better ductility compared with the first sealant section 41, so that during a bending process of the bent wiring portion 20, a stress generated at a junction between the functional layer 30 and the second sealant section 42 can be well released.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A display module, comprising:
   a display panel comprising a display area, a non-display area adjacent to the display area, a display functional portion located in the display area, and a bent wiring portion located in the non-display area;
   a functional layer disposed on the display panel; and
   a sealant layer disposed on the bent wiring portion and located in the non-display area,
   wherein the sealant layer comprises a first sealant section spaced apart from the functional layer and a second sealant section filled between the first sealant section and the functional layer, and
   wherein two ends of the second sealant section are bonded to the functional layer and the first sealant section respectively, an elastic modulus of the second sealant section is less than or equal to 80% of an elastic modulus of the first sealant section, and a distance between the functional layer and the first sealant section is larger than 0 and less than or equal to 0.5 mm.

2. The display module according to claim 1, wherein the first sealant section and the second sealant section are made of same material, the first sealant section and the second sealant section are an integral structure, and a curing rate of the second sealant section is slower than a curing rate of the first sealant section.

3. The display module according to claim 1, wherein a material of the second sealant section is different from a material of the first sealant section, and an elastic modulus of the material of the second sealant section is smaller than an elastic modulus of the material of the first sealant section.

4. The display module according to claim 3, wherein one end of the second sealant section is bonded to the functional layer, and another end of the second sealant section extends to the first sealant section and at least partially covers the first sealant section.

5. The display module according to claim 1, wherein the bent wiring portion comprises a first wiring section adjacent to the display functional portion, a bent wiring section disposed at one end of the first wiring section away from the display functional portion, and a second wiring section disposed at one end of the bent wiring section away from the first wiring section; and the first sealant section is disposed on the bent wiring section and covers the bent wiring section.

6. The display module according to claim 5, wherein the display module further comprises a backplane disposed on a side of the display panel away from the sealant layer, the backplane comprises a first backplane and a second backplane, an interval section corresponding to a position of the bent wiring section is provided between the first backplane and the second backplane, and a length of the interval section is less than or equal to a length of the bent wiring section.

7. The display module according to claim 1, wherein the display functional portion comprises at least one bent display section, and the elastic modulus of the second sealant section is less than or equal to 60% of the elastic modulus of the first sealant section.

8. A method of manufacturing a display module, comprising the following steps:
   providing a display panel, wherein the display panel comprises a display area, a non-display area adjacent to the display area, a display functional portion located in the display area, and a bent wiring portion located in the non-display area;

forming a functional layer on the display panel; and
forming a sealant layer on the display panel in the non-display area, wherein the sealant layer comprises a first sealant section spaced apart from the functional layer and a second sealant section filled between the first sealant section and the functional layer, and
wherein two ends of the second sealant section are bonded to the functional layer and the first sealant section respectively, an elastic modulus of the second sealant section is less than or equal to 80% of an elastic modulus of the first sealant section, and a distance between the functional layer and the first sealant section is larger than 0 and less than or equal to 0.5 mm.

9. The method of manufacturing the display module according to claim 8, wherein the step of forming the sealant layer on the display panel in the non-display area comprises:
forming a photosensitive adhesive layer on the display panel in the non-display area and in contact with the functional layer; and
performing a light curing step to cure the photosensitive adhesive layer to form the sealant layer, wherein the photosensitive adhesive layer comprises a first sub-adhesive spaced apart from the functional layer and a second sub-adhesive located between the first sub-adhesive and the functional layer, a light irradiation duration of the second sub-adhesive is less than a light irradiation duration of the first sub-adhesive, so that the elastic modulus of the second sealant section formed by curing the second sub-adhesive is smaller than the elastic modulus of the first sealant section formed by curing the first sub-adhesive.

10. The method of manufacturing the display module according to claim 8, wherein the step of forming the sealant layer on the display panel in the non-display area comprises:
forming a first photosensitive adhesive layer on the display panel in the non-display area and spaced apart from the functional layer, and curing the first photosensitive adhesive layer by a first curing step to form the first sealant section; and
forming a second photosensitive adhesive layer on the display panel in the non-display area and filled between the first sealant section and the functional layer, and curing the second photosensitive adhesive by a second curing step to form the second sealant section, so that the sealant layer comprising the first sealant section and the second sealant section is obtained, wherein a curing agent in the second photosensitive adhesive layer has a larger proportion than a curing agent in the first photosensitive adhesive layer.

11. A display device, comprising:
a display panel comprising a display area, a non-display area adjacent to the display area, a display functional portion located in the display area, and a bent wiring portion located in the non-display area;
a functional layer disposed on the display panel; and
a sealant layer disposed on the bent wiring portion and located in the non-display area,
wherein the sealant layer comprises a first sealant section spaced apart from the functional layer and a second sealant section filled between the first sealant section and the functional layer, and
wherein two ends of the second sealant section are bonded to the functional layer and the first sealant section respectively, an elastic modulus of the second sealant section is less than or equal to 80% of an elastic modulus of the first sealant section, and a distance between the functional layer and the first sealant section is larger than 0 and less than or equal to 0.5 mm.

12. The display device according to claim 11, wherein the first sealant section and the second sealant section are made of same material, the first sealant section and the second sealant section are an integral structure, and a curing rate of the second sealant section is slower than a curing rate of the first sealant section.

13. The display device according to claim 11, wherein a material of the second sealant section is different from a material of the first sealant section, and an elastic modulus of the material of the second sealant section is smaller than an elastic modulus of the material of the first sealant section.

14. The display device according to claim 13, wherein one end of the second sealant section is bonded to the functional layer, and another end of the second sealant section extends to the first sealant section and at least partially covers the first sealant section.

15. The display device according to claim 11, wherein the bent wiring portion comprises a first wiring section adjacent to the display functional portion, a bent wiring section disposed at one end of the first wiring section away from the display functional portion, and a second wiring section disposed at one end of the bent wiring section away from the first wiring section; and the first sealant section is disposed on the bent wiring section and covers the bent wiring section.

16. The display device according to claim 15, wherein the display device further comprises a backplane disposed on a side of the display panel away from the sealant layer, the backplane comprises a first backplane and a second backplane, an interval section corresponding to a position of the bent wiring section is provided between the first backplane and the second backplane, and a length of the interval section is less than or equal to a length of the bent wiring section.

17. The display device according to claim 11, wherein the display functional portion comprises at least one bent display section, and the elastic modulus of the second sealant section is less than or equal to 60% of the elastic modulus of the first sealant section.

* * * * *